Sept. 4, 1928.　　　　　　　　　　　　　　　1,682,906
F. D. HOLDSWORTH
VALVE MECHANISM
Filed Dec. 23, 1920
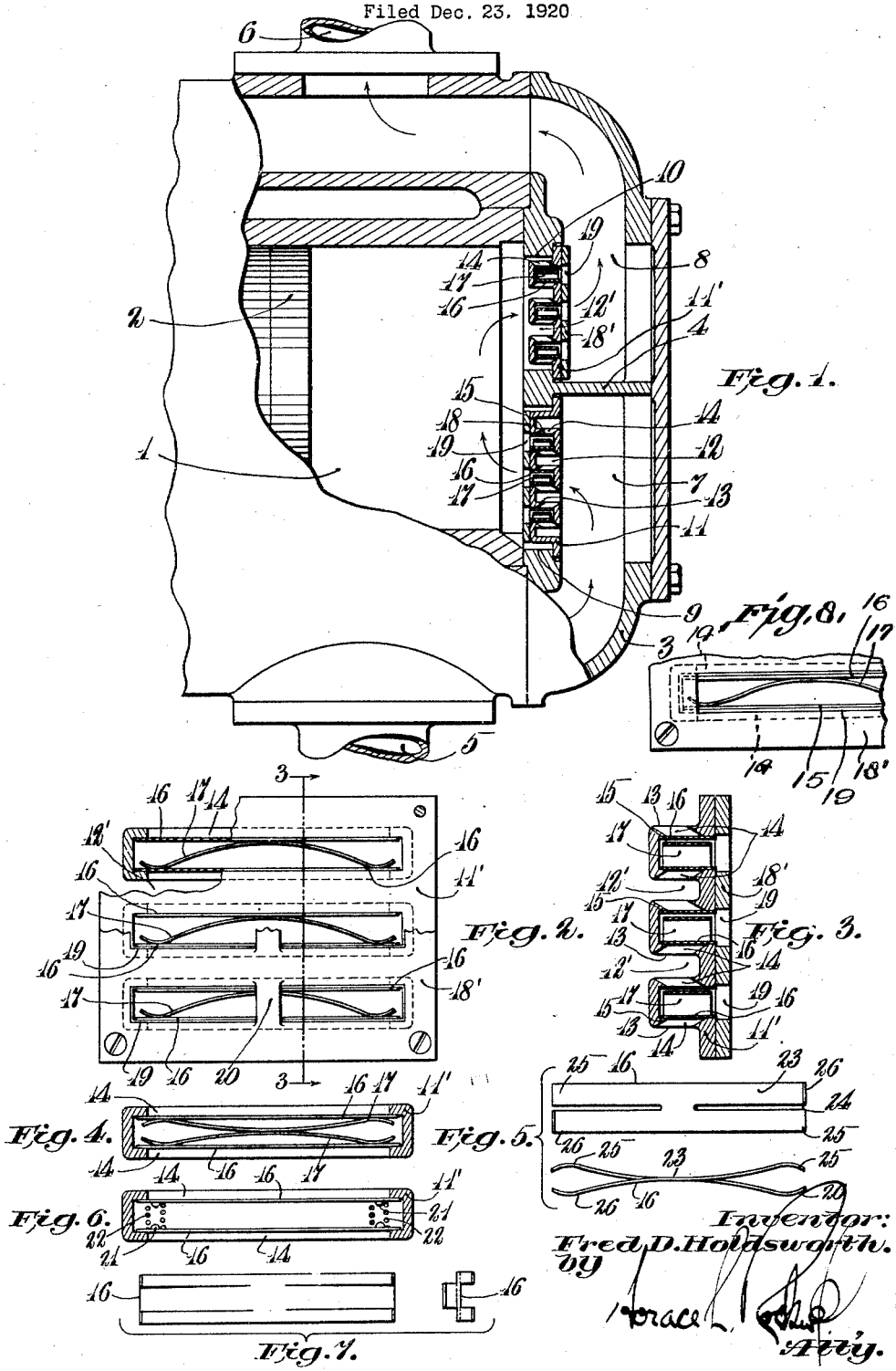

Patented Sept. 4, 1928.

1,682,906

UNITED STATES PATENT OFFICE.

FRED D. HOLDSWORTH, OF CLAREMONT, NEW HAMPSHIRE, ASSIGNOR TO SULLIVAN MACHINERY COMPANY, A CORPORATION OF MASSACHUSETTS.

VALVE MECHANISM.

Application filed December 23, 1920. Serial No. 432,857.

My invention relates to valve mechanisms and particularly to valve mechanisms for compressors or fluid pumps of any type.

An object of my invention is to provide an improved valve mechanism for fluid pumps. Another object of my invention is to provide an improved valve mechanism for that species of fluid pumps of which the air compressor is an example. A further object of my invention is to provide an improved valve mechanism for air compressors in which a single spring may cooperate with a plurality of valve members in an improved manner. Other objects of my invention will appear in the course of the accompanying specification and appended claims.

In the accompanying drawings I have shown for purposes of illustration, one form which my invention may assume in practice, together with certain possible modifications.

In these drawings:

Fig. 1 is a view partially in elevation but mainly in central longitudinal section through one end of a compressor cylinder which is provided with my improved valve mechanism.

Fig. 2 is a fragmentary plan view of one of my improved valve mechanisms, with parts broken away.

Fig. 3 is a section taken on the line 3—3 of Fig. 2.

Fig. 4 is a view taken on a section line cutting the valve casing on a plane perpendicular to the axis of the cylinder and disclosing a modified form of valve mechanism.

Fig. 5 is a view showing a modified form of spring in plan and in side elevation.

Fig. 6 is a view similar to Fig. 4, showing a different type of valve and spring arrangement.

Fig. 7 is a view showing in plan and in end elevation a still different form of spring.

Fig. 8 is a fragmentary view of a modification.

For purposes of illustration I have shown my improved valve mechanism used in a compressor which has a usual cylinder 1, in which a piston 2 reciprocates, and which is provided with heads 3 of which but one is shown. Each of these heads is divided into compartments by a partition 4. With one of these compartments 7, herein the lower, an inlet 5 communicates and from the other compartment 8 fluid is discharged by a suitable connection 6. The rear head of the cylinder has formed in it suitable apertures 9 and 10 for the reception of the valve cages 11 and 11'.

Noting Fig. 1, it will be seen that my improved inlet valve comprises a cage member 11 in whose opposite sides are cast or milled, as may be desired, series of parallel grooves 12, the grooves on one side lying between the grooves on the other and being separated by the relatively thin walls 13 of metal. In these walls are milled longitudinally extending ports 14 and it will be noted that each groove 12 communicates with a pair of oppositely disposed ports 14. In the inlet valve, the valve members proper will be disposed in the grooves lying toward the inside of the cylinder, suitable seats 15 being milled smooth on the lateral walls of the grooves 12 which open towards the cylinder. Cooperating with these seats 15 are valves 16 of thin metallic spring material and disposed between each pair of valves and arranged in each groove 12 is a flexible spring 17 which may take the bowed form shown in Fig. 2, in which it is shown to be made of the same material of which the valves are constructed and with up-turned ends. For the purpose of preventing the valves and springs from working out laterally from the grooves 12 and falling into the cylinder, a suitable cover plate 18 is provided and attached to the cage 11, this cover plate having ports 19 communicating with the grooves 12 in which the valves are arranged and being provided with cross ribs 20 (Fig. 2) to retain the valves in position. It will be obvious, however, that this cover plate may be provided with ports slightly shorter than the lengths of the valves and spring, and the cross bars 20 omitted, the springs and valves then being retained in place by the engagement of their ends under the ends of the cover plate as shown in Fig. 8. The discharge valves are similarly constructed to the inlet valves, the chief difference being that the grooves 12' in which the valves are disposed are arranged communicating with the cavity 8 in the cylinder head instead of with the interior of the cylinder. The cover plate 18' is accordingly placed on that side of the valve cage. It will be noted that the ports or passages 14 intersect the passages with which they cooperate at obtuse angles to the direction of flow through the latter. It will also be observed that this angle is so selected that these passages or ports 14 are disposed at such an angle to the surface of the cage which the cover plate 18 engages that a milling cutter can be caused to work through the flow slots in that surface in cutting the ports or passages 14. Otherwise put, it may be said that the traces of the planes of the side walls of the passages 14 upon the surface upon which the cover 18 seats are lines not further apart than the width of the opening through that surface.

It will be obvious that this construction is not limited to the use of a single spring and that two springs of similar construction may be provided as shown in Fig. 4 and sprung in between the valves, or, as shown in Fig. 6, by upsetting small projections adjacent the center line of the valves as indicated at 21, spiral springs 22 may be used to retain the valves seated. It will be obvious also that as shown in Fig. 5 and Fig. 7, single springs adapted to function as the plurality of springs shown in Fig. 4 may also be employed. The spring shown in Fig. 5 comprises a member 23 slit longitudinally from each end to a point adjacent the center as indicated at 24, and the diagonally opposite end portions 25 are bowed in opposite direction, as are the other end portions 26, 26, whereby a spring of the general type shown in the lower half of Fig. 5 is produced. It is possible, as shown in Fig. 7, to split the spring on lines arranged approximately ¼ and ¾ away from one side of the spring and for a considerable distance from each end; the plate so split then has its central and lateral tongues oppositely bowed. This produces a very desirable and well balanced spring, in which substantially equal force is exerted in opposite directions by each half of the spring. Other possibilities will readily suggest themselves to one skilled in the art.
From the foregoing description it will be seen that I have provided a very simple valve mechanism in which the machine work may be readily accomplished and in which an adequate port area may be provided while using valves of extremely simple construction. By reason of the ports 14 it will be seen that not only is flow in the desired direction accelerated, but that these ports may be very advantageously milled in.
While I have in this application specifically described certain forms which my invention may assume in practice, it will be understood that these forms of the same are shown for purposes of illustration and that the invention may be modified and embodied in other forms without departing from its spirit or the scope of the appended claims.

What I claim as new and desire to secure by Letters Patent is:—
1. In a valve mechanism, a cage member having a pair of adjacent open fluid conducting slots side-by-side therein and opening in different directions from each other, and, connecting said slots, an inclined passage having walls which if extended would pass wholly within the openings of said slots, the opposite ends of opposite sides of each passage lying closely adjacent the surfaces of the cage member through which the slots respectively open and said cage member providing in one of said slots a valve seat surface surrounding one end of said passage.

2. In a valve mechanism, a cage member having open-mouthed fluid conducting slots extending inwardly from one side of said member and an open mouthed slot opening at the opposite side of said member and lying between the first mentioned slots, whereby a single wall spaces the second mentioned slot from one of said first mentioned slots and another single wall spaces the second mentioned slot from the other of the first mentioned slots, each of said walls being traversed by a passage connecting the intermediate slot with the first mentioned slot which is spaced therefrom by said wall, each of said passages being so inclined that if extended it would pass wholly within the open mouths of the slots which it connects, the opposite ends of opposite sides of each passage lying closely adjacent the surfaces of the cage member through which the connected slots open, and each of the said walls providing a valve seat surface surrounding one of said passages.

3. A valve mechanism comprising a member having adjacent open fluid conducting slots on opposite sides thereof, said member comprising opposed walls substantially parallel to each other and separating certain of said slots, each wall being traversed by an inclined passage affording connection between a pair of adjacent slots, and said passages when extended passing through the openings of said connected pair of slots.

4. A valve mechanism comprising a member having adjacent open fluid conducting slots on opposite sides thereof, said member comprising opposed walls substantially parallel to each other and separating certain of said slots, each wall being traversed by an inclined passage affording connection between a pair of adjacent slots, the slots opening through one side of said member having walls closing the opposite ends thereof and said passages when extended passing through the open ends of said last mentioned slots, and valves for controlling the passages in said common walls, said valves being loosely mounted in said slots for rectilinear movements towards and from each other and guided during opening and closing movement against edgewise displacement in one direction by said slot end closing walls.

5. A valve mechanism comprising a member having adjacent open fluid conducting slots on opposite sides thereof, said member comprising opposed walls substantially parallel to each other and separating certain of said slots, each wall being traversed by an inclined passage affording connection between a pair of adjacent slots, the slots opening through one side of said member having walls closing the opposite ends thereof and said passages when extended passing through the open ends of said last mentioned slots, valves for controlling the passages in said common walls, said valves being loosely mounted in said slots and guided during opening and closing movement against displacement in one direction by said slot end closing walls, and springs each common to a pair of valves for holding the same seated, said springs being guided similarly to said valves during movement.

6. A valve mechanism comprising a member having open fluid conducting slots on opposite sides thereof and offset from each other, said member comprising opposed walls substantially parallel to each other and separating certain of said slots, each wall being traversed by an inclined passage affording connection between a pair of offset slots, the slots opening through one side of said member having walls closing the opposite ends thereof and said passages when extended passing through the open ends of said last mentioned slots, valves for controlling the passages in said common walls, said valves being loosely mounted in said slots and guided during opening and closing movement against displacement in one direction by said slot end closing walls, springs each common to a pair of valves for holding the same seated, said springs being guided similarly to said valves during movement, and a cover plate secured to said member at the side of the latter through which said specified slots open and having ports therein overlying said slots, and having means transversely overlying portions of said slots to guide said valves and springs.

In testimony whereof I affix my signature.

FRED D. HOLDSWORTH.